US010793742B2

(12) United States Patent
Prouvost et al.

(10) Patent No.: US 10,793,742 B2
(45) Date of Patent: Oct. 6, 2020

(54) POLYETHERS CONTAINING NON-BISPHENOLIC CYCLIC GROUPS

(71) Applicant: Valspar Sourcing, Inc., Minneapolis, MN (US)

(72) Inventors: Benoit Prouvost, Abergement de Cuisery (FR); Sebastien Gibanel, Givry (FR)

(73) Assignee: VALSPAR SOURCING, INC., Minneapolis, MN (US)

( * ) Notice: Subject to any disclaimer, the term of this patent is extended or adjusted under 35 U.S.C. 154(b) by 856 days.

(21) Appl. No.: 15/307,567

(22) PCT Filed: Apr. 24, 2015

(86) PCT No.: PCT/US2015/027466
§ 371 (c)(1),
(2) Date: Oct. 28, 2016

(87) PCT Pub. No.: WO2015/179064
PCT Pub. Date: Nov. 26, 2015

(65) Prior Publication Data
US 2017/0051177 A1    Feb. 23, 2017

Related U.S. Application Data

(60) Provisional application No. 62/090,586, filed on Dec. 11, 2014, provisional application No. 62/000,278, filed on May 19, 2014.

(51) Int. Cl.
*C09D 163/00*    (2006.01)
*B65D 85/00*    (2006.01)
(Continued)

(52) U.S. Cl.
CPC ........... *C09D 163/00* (2013.01); *B65D 25/00* (2013.01); *B65D 85/70* (2013.01); *C08G 59/04* (2013.01);
(Continued)

(58) Field of Classification Search
CPC .... C09D 163/00; C09D 171/00; B65D 85/70; B65D 25/00; C08G 59/245; C08G 59/066; C08G 59/04; C08G 59/26; C08G 2650/56
USPC .......... 428/413, 418, 423.1, 35.8, 35.7, 447, 428/457, 480, 500, 323, 195.1, 416, 428/36.91, 407, 411.1, 414, 702, 412, 428/522, 209, 36.9, 403, 425.8, 426, 461, 428/704, 901, 1.1, 1.31, 1.53, 331, 354, 428/423.7, 458, 469, 156, 1.5, 1.55, 216, 428/325, 327, 34.1, 402, 404, 405, 423.3, 428/437, 446, 473.5, 474.4, 701, 143, 428/1.51, 1.52, 213, 220, 304.4, 328, 332, 428/336, 34.6, 34.7, 355 EP, 355 R, 365, 428/375, 408, 40.1, 417, 421, 422, 423.5, 428/424.2, 432, 433, 436, 450, 460, 462, 428/472, 482, 515, 521, 523, 524, 626, 428/698, 699, 913, 131, 141, 148, 174, 428/199, 1.3, 1.54, 203, 206, 208, 219, 428/221, 297.4, 307.3, 307.7, 312.6, 428/313.3, 313.9, 317.1, 317.9, 318.4, 428/319.1, 319.3, 329, 32.26, 333, 334, 428/335, 337, 339, 344, 347, 34.8, 352, 428/355 CP, 355 N, 35.9, 367, 36.6, 36.8, 428/371, 372, 380, 385, 389, 390, 391, 428/392, 393, 394, 395, 396, 402.2, 428/402.21, 402.24, 406, 415, 423.4, 428/423.9, 424.4, 424.7, 424.8, 425.5, 428/435, 441, 448, 451, 463, 474.9,
(Continued)

(56) References Cited

U.S. PATENT DOCUMENTS 2,633,458 A    3/1953    Shokal
3,498,952 A    3/1970    Wiener
(Continued)

FOREIGN PATENT DOCUMENTS

CA    2235077        4/1997
EP    0404039 A1    12/1990
(Continued)

OTHER PUBLICATIONS

Abbas., et al., "Synthesis of Mixed-donor Azaoxathia Macrocyclic Tetraamides, Acyclic Polyether di/and Tetraamides and Their C-Pivot Lariat Derivatives," J. Heterocyclic Chern, 2007, vol. 44, pp. 651-661.
(Continued)

*Primary Examiner* — Gerard Higgins
*Assistant Examiner* — Kevin C Ortman, Jr.
(74) *Attorney, Agent, or Firm* — Patterson Thuente Pedersen, P.A.

(57) ABSTRACT

Metal food or beverage containers are coated with a polyether polymer containing at least two ether linkages in the polymer backbone. The polymer is substantially free of segments derived from bisphenol A and epoxides thereof, and is a reaction product of, or can be derived from, (i) an aryl- or heteroaryl-group-containing diepoxide that is not derived from a polyhydric phenol or a glycidyl ester and (ii) a polymer backbone extender that has two functional groups reactive with an epoxy group and which following reaction with the diepoxide provides at least one pendant aryl or heteroaryl group on the polymer backbone, or provides at least one divalent aryl or heteroaryl group in the polymer backbone and linked to the backbone via ether linkages.

20 Claims, No Drawings

(51) Int. Cl.
    *C08G 59/24*     (2006.01)
    *B65D 25/00*     (2006.01)
    *C08G 59/06*     (2006.01)
    *C08G 59/26*     (2006.01)
    *C09D 171/00*    (2006.01)
    *C08G 59/04*     (2006.01)

(52) U.S. Cl.
    CPC ......... *C08G 59/066* (2013.01); *C08G 59/245* (2013.01); *C08G 59/26* (2013.01); *C09D 171/00* (2013.01); *C08G 2650/56* (2013.01)

(58) Field of Classification Search
    USPC ...... 428/475.2, 475.8, 476.9, 483, 504, 505, 428/516, 532, 537.1, 539.5, 627, 632, 428/633, 660, 67, 68, 688, 689, 69, 690, 428/696, 700, 900, 928, 932; 427/386, 427/385.5
    See application file for complete search history.

(56) References Cited

U.S. PATENT DOCUMENTS

| | | |
|---|---|---|
| 3,943,187 A | 3/1976 | Wu |
| 4,076,676 A | 2/1978 | Sommerfeld |
| 4,145,333 A | 3/1979 | Minagawa et al. |
| 4,212,781 A | 7/1980 | Evans et al. |
| 4,246,198 A | 1/1981 | Rosenberger et al. |
| 4,247,439 A | 1/1981 | Matthews et al. |
| 4,285,847 A | 8/1981 | Ting |
| 4,410,681 A | 10/1983 | Prindle |
| 4,413,015 A | 11/1983 | Anderson et al. |
| 4,446,258 A | 5/1984 | Chu et al. |
| 4,517,322 A | 5/1985 | Birkmeyer et al. |
| 4,577,042 A | 3/1986 | Collins et al. |
| 4,963,602 A | 10/1990 | Patel |
| 5,134,218 A | 7/1992 | Brennan et al. |
| 5,296,525 A | 3/1994 | Spencer |
| 5,527,840 A | 6/1996 | Chutko et al. |
| 5,717,054 A | 2/1998 | Schultz |
| 5,830,952 A | 11/1998 | Pedersen et al. |
| 5,922,817 A | 7/1999 | Pedersen et al. |
| 6,465,601 B1 | 10/2002 | Wiesendanger et al. |
| 6,974,631 B2 | 12/2005 | Hayes et al. |
| 7,189,787 B2 | 3/2007 | O'Brien et al. |
| 7,381,472 B2 | 6/2008 | Brandenburger et al. |
| 7,910,170 B2 | 3/2011 | Evans et al. |
| 8,092,876 B2 | 1/2012 | O'Brien et al. |
| 8,129,495 B2 | 3/2012 | Evans et al. |
| 8,202,960 B1 | 6/2012 | Morizur et al. |
| 8,207,287 B1 | 6/2012 | Morizur |
| 8,530,570 B2 | 9/2013 | Mijolovic et al. |
| 9,540,484 B2 | 1/2017 | Craun et al. |
| 9,605,177 B2 | 3/2017 | Tang et al. |
| 2005/0196629 A1 | 9/2005 | Bariatinsky et al. |
| 2006/0182974 A1 | 8/2006 | Garnault et al. |
| 2010/0068433 A1 | 3/2010 | Gibanel et al. |
| 2010/0256322 A1 | 10/2010 | Kramer et al. |
| 2011/0178239 A1 | 7/2011 | Mijolovic et al. |
| 2011/0315591 A1 | 12/2011 | Lespinasse et al. |
| 2012/0149863 A1 | 6/2012 | Morizur |
| 2012/0301646 A1 | 11/2012 | List et al. |
| 2013/0052381 A1 | 2/2013 | Gallucci et al. |
| 2013/0172421 A1 | 7/2013 | Zheng et al. |
| 2013/0206756 A1 | 8/2013 | Niederst et al. |
| 2013/0280455 A1 | 10/2013 | Evans et al. |
| 2013/0316109 A1 | 11/2013 | Niederst et al. |
| 2014/0322465 A1 | 10/2014 | Kaleem et al. |
| 2016/0024337 A1 | 1/2016 | Bode et al. |
| 2016/0032048 A1 | 2/2016 | Craun et al. |
| 2016/0107818 A1 | 4/2016 | Kaleem et al. |
| 2016/0122581 A1 | 5/2016 | You et al. |
| 2016/0194436 A1* | 7/2016 | Karl .................. C07C 29/141 523/400 |

FOREIGN PATENT DOCUMENTS

| | | |
|---|---|---|
| GB | 923772 A | 4/1963 |
| JP | S50-151222 A | 12/1975 |
| JP | 2002-307604 | 10/2002 |
| WO | WO 2006/045017 A1 | 4/2006 |
| WO | WO 2007/048094 A2 | 4/2007 |
| WO | WO 2007/064608 A1 | 6/2007 |
| WO | WO-2010075395 A2 | 7/2010 |
| WO | WO-2011130671 A2 | 10/2011 |
| WO | WO-2012064483 A1 | 5/2012 |
| WO | WO-2012064484 A1 | 5/2012 |
| WO | WO-2012109278 A2 | 8/2012 |
| WO | WO-2012161758 A2 | 11/2012 |
| WO | WO 2013/090702 A2 | 6/2013 |
| WO | WO 2013/119686 A1 | 8/2013 |
| WO | WO 2013/149234 A2 | 10/2013 |
| WO | WO 2014/025411 A1 | 2/2014 |
| WO | WO 2014/025997 A1 | 2/2014 |
| WO | WO-2014025407 A1 | 2/2014 |
| WO | WO 2014/072216 A1 | 5/2014 |
| WO | WO-2014140232 A2 | 9/2014 |
| WO | WO-2014140233 A1 | 9/2014 |
| WO | WO-2014140234 A1 | 9/2014 |
| WO | WO 2015/183892 A1 | 12/2015 |
| WO | WO 2016/201407 A1 | 12/2016 |

OTHER PUBLICATIONS

Agag., et al., "Benzoxazole Resin: A Novel Class of Thermoset Polymer via Smart Benzoxazine Resin," 2012, Macromolecules, vol. 45, pp. 8991-8997.

Behbehani., et al., "Efficient Atom Economic Approaches Towards Macrocyclic Crown Diamides via Ring-Closing Metathesis," 2002, Tetrahedron Letters, vol. 43, pp. 6421-6426.

Benyahya., et al., "Synthesis of Glycerin Carbonate-Based Intermediates Using Thiol-Ene Chemistry and Isocyanate Free Polyhydroxyurethanes Therefrom," 2011, Polym. Chern., pp. 2661-2667.

"Priamine™ 1071—Bridging Flexibility and Hardness of Epoxy Systems for Marine and Protective Coatings," Croda Coatings & Polymers, 2011, 4 pages.

Dytek®, "2-Methylpentamethylenediamine (MPMD) (Dytek® A amine)," Technical Information Sheet, Mar. 15, 2012, 2 pages.

Erichsen, "Bend and Impact Tester Model 471," Technical Description and Operating Instructions, 2007, 2 pages.

Extended European Search Report for Application No. 15796095.6, dated Nov. 7, 2017, 8 pages.

International Search Report and Written Opinion for Application No. PCT/US2014/060845, dated Feb. 6, 2015, 13 pages.

Liew L.P.P., et al., "Discovery and preliminary structure-activity relationship analysis of 1, 14-sperminediphenylacetamides as potent and selective antimalarial lead compounds," Bioorganic & Medicinal Chemistry Letters, 2013, vol. 23, pp. 452-454.

Mikroyannidis J.A., et al., "Synthesis and Thermal Behaviour of New High Temperature Silicon Containing Bismaleimides," British Polymer Journal, 1990, vol. 23, pp. 309-314.

Mitsubishi Gas Chemical Co., Inc., "Outline of Nylon-MXD6," 2007, 2 pages.

International Preliminary Report on Patentability for Application No. PCT/US2014/060845, dated Apr. 28, 2016, 10 pages.

International Preliminary Report on Patentability for Application No. PCT/US2015/027466, dated Dec. 1, 2016, 10 pages.

Raines, D.J., et al., "Interactions of a Peri plasmic Binding Protein with a Tetradentate Siderophore Mimic", Angewandte Chemie Int., 2013, Edition. 52, pp. 4595-4598.

Rosowsky A., et al., "Structural Analogues of L-Glutamic Acid y-(4- Hydroxyanilide) and y-(3,4-Dihydroxyanilide) as Potential Agents against Melanoma," Journal of Medicinal Chemistry, 1979, vol. 22 (9), pp. 1034-1037.

"The Jeffamine® Polyetherimines", Technical Data Sheet, Huntsman, 2007, 6 pages.

(56) References Cited

OTHER PUBLICATIONS

Fache et al., "Vanillin, a promising biobased building-block for monomer synthesis", The Royal Science of Chemistry, Green Chem., 16, pp. 1987-1998, (2014)

Third party observations filed with the EPO dated Jul. 30, 2018 in counterpart EP 15 79 6095.6.

International Search Report and Written Opinion for corresponding International Application No. PCT/US2015/027466 dated Aug. 10, 2015; 12 pages.

Hu et al., Synthesis and Characterization of Thermosetting Furan-Based Epozy Systems, Macromolecules, 47, 3332-3342, 3335 (May 9, 2014).

Potentially safer, greener alternative to BPA could come from papermaking waste, American Chemical Society News Release, 5 pages (Mar. 2014).

Stove, E., BPA substitute made from paper industry leftovers, chemistryworld, 1 page (Mar. 17, 2014).

Lignin-based plastics and a hands-on biodiesel project for first-year engineering students (GCE167), Joseph Stanzione, III, 18th Annual Green Chemistry & Engineering Conference (Jun. 17-19, 2014) available at: https://presentations.acs.org/common/media-player.aspx/GCE2014/GCEE/GCE010/GCE16.

\* cited by examiner

POLYETHERS CONTAINING NON-BISPHENOLIC CYCLIC GROUPS

CROSS REFERENCE TO RELATED APPLICATIONS

This application is a national stage filing under 35 U.S.C. § 371 of International Application No. PCT/US2015/027466 filed Apr. 24, 2015, which claims priority under 35 U.S.C. § 119 to U.S. Provisional Application Nos. 62/000,278 filed May 19, 2014 and 62/090,586 filed Dec. 11, 2014, the disclosures of both of which are incorporated herein by reference.

TECHNICAL FIELD

This invention relates to container coatings and coated containers.

BACKGROUND

Bisphenol A has been used to prepare polymers having a variety of properties and uses. For example, bisphenol A may be reacted with epichlorohydrin to provide polymers useful in packaging coatings. There is a desire to reduce or eliminate the use of certain bisphenol A-derived polymers in container coatings, and especially those involving contact with foods or beverages. Although a number of replacement coating compositions made without bisphenol A have been proposed, some replacement compositions have exhibited insufficient coating properties such as insufficient corrosion resistance on metal substrates, insufficient flexibility or insufficient toughness. Corrosion resistance is especially important when the coating will contact foods or beverages that might react with the substrate, for example acidic foods or beverages.

Accordingly it will be appreciated that what is needed in the art are improved coating compositions that are made without intentionally using bisphenol A, but which have sufficient corrosion resistance on metal substrates to permit the use of such coating compositions in food contact applications.

SUMMARY

The aromatic content in packaging coatings based on polymers derived from bisphenol A may help increase the glass transition temperature ("Tg") of such polymers, and may also help increase the corrosion resistance of metal substrates coated with coating compositions based on such polymers. For coating compositions made without employing bisphenol monomers, corrosion resistance may be improved by forming the polymer from one or more aliphatic diols (or from one or more diglycidyl ethers of such diols) containing aromatic groups that are not derived or derivable from bisphenol monomers. The aromatic groups may be pendant from the eventual polymer backbone. The aromatic groups may also or instead be part of the eventual polymer backbone and linked to the backbone via ether linkages. The diol hydroxyl groups may be on the same or different carbon atoms. The polymer may be a polyether polymer, or a copolymer containing a plurality of ether linkages and other linkages. In some embodiments, the polyether polymer has a polymer backbone that does not include ester linkages.

The present invention thus provides, in one aspect, an article comprising a food or beverage container, or a portion thereof, having a metal substrate and a coating suitable for food contact applied on at least a portion of the metal substrate, wherein the coating is formed from a coating composition that includes a polyether polymer having a polymer backbone and preferably a number average molecular weight of at least 2,000 and a glass transition temperature of at least 30° C.; wherein the polymer contains at least two ether linkages in the polymer backbone; is substantially free of segments derived from bisphenol A and epoxides thereof (and preferably is substantially free of segments derived from bisphenol monomers or epoxides of bisphenol monomers); and is a reaction product of, or can be derived from, reactants including: (i) an aryl- or heteroaryl-group-containing diepoxide that is not derived from a polyhydric phenol or a glycidyl ester and (ii) a polymer backbone extender that has two functional groups reactive with an epoxy group and which following reaction with the diepoxide provides at least one pendant aryl or heteroaryl group on the polymer backbone, or provides at least one divalent aryl or heteroaryl group in the polymer backbone and linked to the backbone via ether linkages.

In an embodiment, the diepoxide or the extender includes a segment of Formula I shown below:

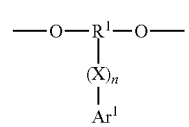

wherein:
each depicted oxygen atom in Formula I is preferably present in an ether linkage;
$R^1$ is a trivalent organic group (preferably an alkyl or cycloalkyl group, and preferably not including an aryl or heteroaryl group) having from 1 to about 10 carbon atoms, for example from 2 to about 10, from 2 to about 8, from 2 to about 6 or from 3 to about 6 carbon atoms;
X is a divalent group (for example, a carbon-containing group, a heteroatom such as an oxygen or sulfur atom, or a nitrogen-containing group), and preferably a divalent organic group having from 1 up to about 10 carbon atoms, for example from 1 to about 8, from 1 to about 6 or from 2 to about 6 carbon atoms;
n is 0 or 1; and
$Ar^1$ is an aryl or heteroaryl group which does not contain a bisphenol monomer segment, and preferably having 5, 6, or up to about 20 ring carbon atoms, and.

In an embodiment, the diepoxide has a structure of Formula II shown below:

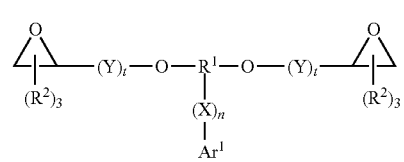

wherein:
each depicted oxygen atom in Formula II attached to $R^1$ is preferably present in an ether linkage;
$R^1$, X, n, and $Ar^1$ are as defined in Formula I;

Y, if present, is independently a divalent organic group including at least one carbon atom, preferably from 2 to about 10 carbon atoms;

each t is independently 0 or 1; and each $R^2$ is independently a hydrogen atom or a hydrocarbon group that may include one or more heteroatoms, and preferably each $R^2$ is a hydrogen atom.

In an embodiment, the extender has a structure of Formula III shown below:

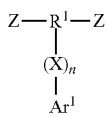    III wherein:

$R^1$, X, n, and $Ar^1$ are as defined in Formula I; and each Z is independently an epoxide-reactive functional group (such as a hydroxyl group or acid group), or both Z moieties may together with $R^1$ form an acid anhydride.

In various embodiments, the segment of Formula I, diepoxide of Formula II or extender of Formula III have atomic weights less than about 500 Daltons.

In another embodiment, the diepoxide or the extender includes a segment of Formula IV shown below:

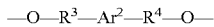    IV wherein:

the terminal oxygen atoms attached to $R^3$ and $R^4$ in Formula IV are preferably present in ether linkages;

$R^3$ and $R^4$ independently are each divalent organic groups having from 1 to about 10 carbon atoms; and $Ar^2$ is a divalent nonphenolic aryl or heteroaryl group which does not contain a segment derived from a bisphenol monomer, and preferably having 5, 6, or up to about 10 ring carbon atoms.

In some embodiments of the Formula IV extender segment, $R^3$, $R^4$ or both $R^3$ and $R^4$ do not include an ester linkage directly attached to $Ar^2$, and in some embodiments $R^3$, $R^4$ or both $R^3$ and $R^4$ do not include any ester linkages.

In an embodiment, the diepoxide has Formula V shown below:

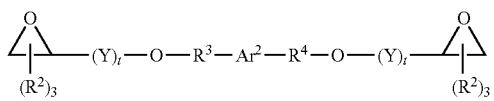    V wherein:

the depicted oxygen atoms attached to $R^3$ and $R^4$ in Formula V are preferably present in ether linkages;

$R^3$, $R^4$ and $Ar^2$ are as defined in Formula IV; and

Y, t and $R^2$ are as defined in Formula II.

In an embodiment, the extender has Formula VI shown below:

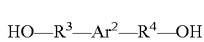    VI wherein:

$R^3$, $R^4$ and $Ar^2$ are as defined in Formula IV; and with the proviso that the —$R^3$OH and —$R^4$OH groups in Formula VI are hydroxyl groups (viz., not carboxylic groups).

In some embodiments, the extender is a phenolic compound that is non-bisphenolic, and more preferably a dihydric monophenol selected from one or more of hydroquinone; resorcinol; catechol; or a mono-, di-, tri-, or tetra-substituted variant thereof. In some such embodiments, the extender is reacted with a diepoxide having a segment of Formula I, a diepoxide of Formula II, a diepoxide having a segment of Formula IV, a diepoxide of Formula V, or a combination thereof.

In various embodiments, the segment of Formula IV, diepoxide of Formula V or extender of Formula VI have atomic weights less than about 500 Daltons.

The polymer contains at least two and preferably many ether linkages in the polymer backbone, and at least one and preferably many pendant aryl or heteroaryl groups on the polymer backbone, or at least one and preferably many divalent aryl or heteroaryl groups in the polymer backbone. Without intending to be bound by theory, the presence of the recited aryl or heteroaryl groups may contribute both to increased polymer Tg and improved corrosion resistance on metal substrates, and may provide other desirable coating properties.

DETAILED DESCRIPTION

As used herein, "a," "an," "the," "at least one," and "one or more" are used interchangeably. Thus, for example, a coating composition that contains "a" stabilizer can be interpreted to mean that the coating composition includes "one or more" stabilizers.

The term "backbone" when used with respect to a polymer means a continuous series of covalently bonded atoms that together form a chain (typically the longest chain) in the polymer.

The term "bisphenol monomer" refers to a polyhydric polyphenol having two phenylene groups that each include a six-carbon ring and a hydroxyl group attached to a carbon atom of the ring, wherein the rings of the two phenylene groups are linked by a chain of up to 10 atoms (typically carbon atoms) in length and do not share any atoms in common. The term "bisphenol monomer" does not include adducts of dihydric monophenols and linking compounds such as diacids or diepoxides that do not include any structural units derived from a bisphenol monomer. Thus, for example, a polyether polymer formed via reaction of the following ingredients is free of structural units derived from a bisphenol monomer: (i) a diepoxide of Formulas II or V and (ii) an adduct of two equivalents of hydroquinone reacted with one equivalent of 1,4-cyclohexanedimethanol diglycidyl ether ("CHDMDGE").

The terms "comprises" and variations thereof do not have a limiting meaning where these terms appear in the description and claims.

The term "crosslinker" refers to a molecule capable of forming a covalent linkage between copolymers (e.g., between polymers) or between two different regions of the same copolymer.

The term "easy open end" refers to a can end (typically an end of a food or beverage container) that includes (i) a frangible opening portion (which for some beverage can ends functions as a drinking spout) and (ii) a riveted portion for attaching a pull tab thereto for purposes of opening the frangible opening portion to access the product housed within a can or container.

The terms "estrogenic activity" or "estrogenic agonist activity" refer to the ability of a compound to mimic hormone-like activity through interaction with an endogenous estrogen receptor, typically an endogenous human estrogen receptor.

The term "food-contact" when used in respect to a surface or a coating refers to an exposed surface (e.g., an uncoated substrate or a coating on a substrate) of an article (e.g., a food or beverage container) that is in contact with, or is suitable for extended contact with, a food or beverage product.

The term "functional group" when used in respect to a polymer refers to a group that can react (for example with a molecule of another polymer, a crosslinking agent or a salt) and thereby change properties of the polymer including properties such as molecular weight, solubility, surface energy, further reactivity and the like.

The term "glass transition temperature" or "Tg" when used in respect to a polymer in a coating composition or a coated article coated with such a composition refers to the measured Tg obtained prior to any cure of such coating composition, and may be measured using differential scanning calorimetry ("DSC") as shown below.

The term "mobile" when used with respect to a compound in a coating composition means that the compound can be extracted from the coating composition when a coating (typically ~1 mg/cm$^2$) is exposed to a test medium for some defined set of conditions, depending on the end use. Examples of these testing conditions include exposure of the cured coating to HPLC-grade acetonitrile for 24 hours at 25° C. Other examples include exposure of the cured coating to 3 wt. % acetic acid (a simulant for aqueous and acidic foodstuffs), 10 vol. % ethanol (a simulant for alcoholic foodstuffs containing up to 10% alcohol), 50 vol. % ethanol (a simulant for milky foodstuffs), rectified olive oil, or alternatives to olive oil such as 95 vol. % ethanol, isooctane or modified polyphenylene oxide (MMPO). Exemplary procedures and limits are set out in European Union Commission Directives 82/711/EEC, 93/8/EEC and 97/48/EC and in 21 CFR section 175.300, paragraphs (d) and (e).

The term "non-bisphenolic" when used with respect to a polymer means that the polymer is substantially free of segments derived from or derivable from a bisphenol monomer.

The term "non-phenolic" when used with respect to a polymer means that the polymer is substantially free of segments derived from or derivable from a phenol.

The term "on," when used in the context of a coating applied on a surface or substrate, includes both coatings applied directly or indirectly to the surface or substrate. Thus for example, a coating applied to a primer layer overlying a substrate constitutes a coating applied on the substrate.

The term "organic group" means a hydrocarbon group (with optional elements other than carbon and hydrogen, such as oxygen, nitrogen, sulfur, and silicon) that may be further classified as an aliphatic group, cyclic group (e.g., aromatic and cycloaliphatic groups), or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group (e.g., an n-propyl isopropyl group). The term "alkenyl group" means an unsaturated, linear or branched hydrocarbon group with one or more carbon-carbon double bonds (e.g., a vinyl group). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. A group that may be the same as or different from other groups may be referred to as being "independently" something. Substitution on the organic groups of compounds of the present invention is contemplated. The terms "group" and "moiety" may be used to differentiate between chemical species that allow for substitution or that may be substituted and those that do not allow or may not be so substituted. The term "group" is intended to be a recitation of both the particular moiety, as well as a recitation of the broader class of substituted and unsubstituted structures that includes the moiety. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, isopropyl, t-butyl, heptyl, dodecyl, octadecyl, amyl, 2-ethylhexyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, isopropyl, t-butyl, heptyl, dodecyl, octadecyl, amyl, 2-ethylhexyl, and the like.

The term "pendant group" when used with respect to a polymer refers to a group (viz., a side group) attached to the polymer at one or more atoms located between end atoms of the polymer backbone. Typically, a pendant group may be a functional or a non-functional group.

The term "polyphenol" refers to a polyhydric material having at least two phenylene groups that each include a six-carbon ring and at least one hydroxyl group attached to a carbon atom of the ring, wherein the rings of the phenylene groups do not share any atoms in common.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "substantially free" when used with respect to a coating composition that may contain a particular mobile compound means that the coating composition contains less than 1,000 parts per million (ppm) of the recited mobile compound. The term "essentially free" when used with respect to a coating composition that may contain a particular mobile compound means that the coating composition contains less than 100 parts per million (ppm) of the recited mobile compound. The term "essentially completely free" when used with respect to a coating composition that may contain a particular mobile compound means that the coating composition contains less than 5 parts per million (ppm) of the recited mobile compound. The term "completely free" when used with respect to a coating composition that may contain a particular mobile compound means that the coating composition contains less than 20 parts per billion (ppb)

of the recited mobile compound. If the aforementioned phrases are used without the term "mobile" (e.g., "substantially free of BPA compound") then the compositions of the present invention contain less than the aforementioned amount of the compound whether the compound is mobile in the coating or bound to a constituent of the coating. When the phrases "free of" (outside the context of the aforementioned phrases), "does not include any" and the like are used herein, such phrases are not intended to preclude the presence of trace amounts of the pertinent structure or compound which may be present as environmental contaminants or due to environmental contamination.

The term "terminal group" when used with respect to a polymer refers to a group attached to a polymer at one or more end atoms of the polymer backbone. Typically, a terminal group will be a functional group.

Also herein, the recitations of numerical ranges by endpoints include all numbers subsumed within that range (e.g., 1 to 5 includes 1, 1.5, 2, 2.75, 3, 3.80, 4, 5, and the like).

DETAILED DESCRIPTION

The disclosed polymer preferably is a polyether polymer. The disclosed polymer typically will be prepared by reacting together (i) an aryl- or heteroaryl-group-containing diepoxide that is not derived from a polyhydric phenol and (ii) a polymer backbone extender that has two functional groups reactive with an epoxy group. The polymer is substantially free of segments derived from bisphenol A and epoxides thereof. In some embodiments, the polyether polymer is also substantially free of segments derived from any or all of bisphenol F, bisphenol S and epoxides thereof. In some embodiments, the polyether polymer is substantially free of segments derived from bisphenol monomers and epoxides thereof. In some embodiments, the polyether polymer is essentially free of bound polyhydric phenols having estrogenic activity greater than or equal to that of bisphenol S, and epoxides thereof. In preferred embodiments, the polymer, diepoxide and extender are non-bisphenolic. In some embodiments, the aryl or heteroaryl groups in the polyether polymer are phenylene groups. In some embodiments, the heteroaryl groups in the polyether polymer are furanylene groups.

Typically, both the diepoxide and the extender will each be monomers. The resulting polyether polymer will have increased molecular weight compared to the starting diepoxide and extender, a plurality of ether linkages and at least one pendant aryl or heteroaryl group on the polymer backbone, or at least one aryl or heteroaryl group in the polymer backbone and linked to it via ether linkages. In some embodiments, one of the diepoxide or the extender provides a pendant aryl or heteroaryl group on the polymer backbone and the other of the diepoxide or the extender provides an aryl or heteroaryl group in the polymer backbone and linked to it via ether linkages. In some embodiments, the diepoxide includes a single aryl or heteroaryl group, and in other embodiments the diepoxide includes a plurality of aryl or heteroaryl groups. In some embodiments, the polymer contains at least 25 wt. % or at least 45 wt. % aryl or heteroaryl groups. In some embodiments the polyether polymer is phenolic, and in other embodiments the polyether polymer is non-phenolic. In some embodiments, the diepoxide, the extender or both the diepoxide and the extender are non-phenolic. In some embodiments the extender is phenolic and the diepoxide is non-phenolic. In some embodiments, the diepoxide is formed from a diol containing a backbone or pendant aryl or heteroaryl group.

Suitable diepoxides may be obtained from a variety of sources, and may for example include diepoxides of Formulas II and V shown above and diepoxides containing segments of Formulas I or IV shown above. In some embodiments, the diepoxide is formed from a non-bisphenolic diol containing a backbone or pendant aryl or heteroaryl group. An especially convenient diepoxide may be prepared by reacting a substantial excess of epichlorohydrin with one or more of the polymer backbone extenders disclosed herein to provide a diepoxide having terminal oxirane groups. The diepoxide may then be further reacted with the same or another one or more of the disclosed polymer backbone extenders to provide the disclosed polyether polymer. Suitable diepoxides may in many cases also be commercially obtained. Exemplary diepoxides include the reaction products of epichlorohydrin with compounds containing segments of Formulas I or IV, the reaction products of epichlorohydrin with compounds of Formula VI shown above, the reaction products of epichlorohydrin with the polymer backbone extenders described below; the diglycidyl ether of vanillyl alcohol; the diglycidyl ether of 2,5-furandimethanol; and 1,2-benzenedimethanol diglycidyl ether, 1,3-benzenedimethanol diglycidyl ether, 1,4-benzenedimethanol diglycidyl ether, 1-phenyl-1,2-ethanediol diglycidyl ether and 2-phenyl-1,2-propanediol diglycidyl ether as described in Published International Application No. WO 2013/090702A2. Although diepoxides in the form of diglycidyl ethers are preferred, it is also contemplated that diglycidyl ester compounds may be used (e.g., diepoxides formed via reaction of epichlorohydrin with the diacid extenders described below).

The reaction between the polymer backbone extender and the diepoxide may be carried out using techniques that will be familiar to persons having ordinary skill in the art. The reaction preferably is performed in an alkaline medium. The desired alkalinity may be obtained by adding basic substances (for example sodium or potassium hydroxide, preferably in stoichiometric excess) to the epichlorohydrin. The reaction preferably is carried out at temperatures of about 50° C. to 150° C. Heating preferably is continued for several hours to complete the reaction and the product is then washed free of salt and base and purified in order to remove byproducts (for example chlorinated species and tri- or higher-functional byproducts). Procedures for such reactions are disclosed, for example, in U.S. Pat. No. 2,633,458.

The disclosed polymer backbone extender includes two functional groups reactive with an epoxy group. Exemplary such groups include hydroxyl groups, amine groups, acid groups, acid chloride groups and acid anhydride groups, with hydroxyl groups, amine groups and acid groups being preferred and hydroxyl groups being especially preferred. Hydroxyl groups attached directly to aryl or heteroaryl groups (e.g., phenolic hydroxy groups) are a preferred class of extender hydroxyl groups. Exemplary extenders include polyhydric phenols (e.g., dihydric phenols of Formula VII shown below such as catechol, hydroquinone, resorcinol and substituted variants thereof), phenolic acids, polyhydric phenolic esters (such as the polyhydric phenolic ester obtained by the reaction of a diol such as ethylene glycol with a hydroxybenzoic acid such as meta-hydroxybenzoic acid), phenolic amines, amidodiphenols, extenders containing segments of Formulas I or IV shown above, and extenders having Formula VI shown above. Hydroxyl group-containing polymer backbone extenders that can provide at least one pendant aryl or heteroaryl group on the polymer backbone following reaction with the diepoxide include 1-phenyl-1,2-ethanediol (CAS No. 93-56-1), 2-phenyl-1,2-propanediol (CAS No. 4216-66-7), 2-phenyl-1,3-propanediol (CAS No. 1570-95-2), 1-phenyl-1,2-propanediol (CAS No. 1855-09-0), 1-phenyl-1,3-propanediol (CAS No. 4850-49-1), the diols shown in U.S. Patent Application Publication No. US 2011/0178239 A1, enantiomers thereof, substituted variants thereof, their homologs, substituted variants thereof, and mixtures thereof. Amine group-containing polymer backbone extenders that can provide at least one pendant aryl or heteroaryl group on the polymer backbone following reaction with the diepoxide include 1-phenyl ethylene diamine, 1-phenyl-1,3-propane diamine, 2-phenyl-1,3-propane diamine, their homologs, substituted variants thereof, and mixtures thereof. Acid group-containing polymer backbone extenders that can provide at least one pendant aryl or heteroaryl group on the polymer backbone following reaction with the diepoxide include 2-phenyl pentanedioic acid, 3-phenyl pentanedioic acid, 4-phenyl pentanedioic acid, their homologs, substituted variants thereof, acid chlorides thereof, acid anhydrides thereof, and mixtures thereof.

Polymer backbone extenders that can provide at least one divalent aryl or heteroaryl group in the polymer backbone and linked to it via ether linkages include 1,2-benzenedimethanol (CAS No. 612-14-6), 1,3-benzenedimethanol (CAS No. 626-18-6), 1,4-benzenedimethanol (CAS No. 589-27-7), 1,4-benzenediethanol (CAS No. 5140-3-4), 1,3-benzenedipropanol (CAS NO. 41009-85-2), 1,4-benzenedipropanol (CAS NO. 19417-58-4, 2-(4-hydroxyphenyl) ethanol (CAS No. 510-94-0), 4,4'-(1,4-phenylene)bis(4-methyl-2-pentanol), vanillyl alcohol (CAS No. 498-00-0), 2,5-furandimethanol (CAS No. 1883-75-6), enantiomers thereof, and mixtures thereof.

Polymer backbone extenders that are not diphenols but which include or can provide a phenolic hydroxyl group reactive with an epoxy group include 2-(3-hydroxyphenyl) ethanol (CAS No. 13398-94-2), 2-hydroxyphenethyl alcohol (CAS No. 7768-28-7), 2-hydroxyphenylacetic acid (CAS No. 614-75-5), 4-hydroxy-3,5-dimethoxybenzoic acid (syringic acid, CAS No. 530-57-4), coumarin (CAS No. 91-64-5), the above-mentioned polyhydric phenolic esters, and mixtures thereof.

The polymer backbone extender may be used in the form in which it is obtained, or may be purified prior to use. Exemplary purification methods will depend on factors including the chosen extender and its physical state (e.g., solid or liquid) at the temperature chosen for reaction with the diepoxide. Exemplary purification methods will be familiar to persons having ordinary skill in the art and include washing with solvent, solvent extraction, flotation, filtration, centrifugation, evaporation, crystallization, recrystallization, fractionation, electrolysis, sublimation, adsorption, distillation and biological methods including fermentation, microbes and enzymes.

The reaction between the polymer backbone extender and the diepoxide may be carried out using techniques that will be familiar to persons having ordinary skill in the art. The reaction preferably is performed under conditions like those discussed above for epichlorohydrin reactions.

The polyether polymer may for example include at least 2, at least 4, at least 6 or at least 8 and up to 10, up to 12 or up to 15 ether linkages in the polymer backbone. The number of ether linkages may influence properties such as polymer polarity. The polymer desirably has sufficient polarity to exhibit good adhesion and wettability on metal substrates. In some embodiments, the polyether polymer has a low viscosity. In other embodiments, the polyether polymer has a high viscosity and is applied to a desired metal substrate by dissolving the polymer in a suitable coating solvent.

The polyether polymer preferably has a number average molecular weight (Mn) of at least 2,000, and may for example have an Mn of at least about 2,500, at least about 3,000 or at least about 4,000. The upper limit for the polyether polymer molecular weight will in general be governed by considerations such as the polymer solubility limit in the chosen coating solvent, and may for example be an Mn value of less than about 20,000, less than about 10,000, less than about 8,000 or less than about 6,000. In one embodiment, the polyether polymers have Mn values that are the same as or similar to the Mn values of commercially available BPA-based epoxy materials (e.g., those available under trade designations such as EPON 828, 1001, 1007 and 1009 from Resolution Performance Products, Houston, Tex.), as doing so may simplify product reformulation and removal of BPA materials. In some embodiments, the polyether polymer has a polydispersity index of about 2 to about 5.

The polyether polymer will typically have a Tg of at least 30° C., and preferably a Tg of at least 60° C., at least 70° C., or at least 80° C. The Tg may for example also be less than 150° C., less than 130° C., or less than 110° C. While not intending to be bound by any theory, it is believed that selection of a suitable Tg value may be especially important in applications where the coating composition will be in contact with food or beverage products during retort processing at high temperature (e.g., at temperatures at or above about 100° C. and sometimes accompanied by pressures in excess of atmospheric pressure), particularly when retorting products that are more chemically aggressive in nature such as acidic foods or beverages.

If desired, one or more comonomers or co-oligomers may also be included with the reactants used to generate the disclosed polyether polymer (or added to the polyether polymer after its initial formation) to advance its molecular weight. For example, a variety of diols may be employed to build molecular weight. Dihydric phenols are one such class of extenders and, as discussed above, may alternatively (or additionally) be used as the "primary" extender in reacting with a diepoxide compound (e.g., a diepoxide compound of Formulas I, II, IV, or V) component to build molecular weight. In some embodiments the dihydric phenol has a molecular weight of from about 100 to about 400 Daltons. Exemplary dihydric phenols include hindered diphenols (for example, 4,4'-methylenebis(2,6-dimethylphenol) as described in U.S. application Ser. No. 13/570,743 (Niederst et al. '743); nonsubstituted diphenols having low estrogenicity (for example, 4,4'-(1,4-phenylenebis(propane-2,2-diyl))diphenol and 2,2'methylenebis(phenol)) as also described in Niederst et al. '743; diphenols such as those described (for example, the bis-4-hydroxybenzoate of cyclohexanedimethanol) in U.S. Pat. No. 8,129,495 B2 (Evans et al. '495); and the dihydric compounds of Formula VII shown below:

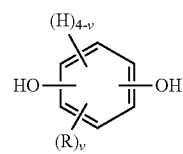

VII wherein:
each R, if present, is preferably independently an atom or group preferably having at atomic weight of at least 15 Daltons that is preferably substantially nonreactive with an epoxy group;
v is 0 to 4; and
two or more R's groups can optionally join to form one or more cyclic groups.

Exemplary dihydric compounds of Formula VII include catechol and substituted catechols (e.g., 3-methylcatechol, 4-methyleatechol, 4-tert-butyl catechol, and the like); hydroquinone and substituted hydroquinones (e.g., methylhydroquinone, 2,5-dimethylhydroquinone, trimethylhydroquinone, tetramethylhydroquinone, ethylhydroquinone, 2,5-diethylhydroquinone, triethylhydroquinone, tetraethylhydroquinone, tert-butylhydroquinone, 2,5-di-tert-butylhydroquinone, and the like); resorcinol and substituted resorcinols (e.g., 2-methylresorcinol, 4-methyl resorcinol, 2,5-dimethylresorcinol, 4-ethylresorcinol, 4-butylresorcinol, 4,6-di-tert-butylresorcinol, 2,4,6-tri-tert-butylresorcinol, and the like); and variants and mixtures thereof. Additional suitable dihydric compounds are disclosed in U.S. Patent Application Publication No. US 2013/0206756 A1 (Niederst et al. '756) and International Application No. WO 2013/119686 A1(Niederst et al. '686. In some embodiments, a bisphenol monomer may be used as the extender. In such embodiments, any bisphenol monomers used preferably have low estrogenicity. Exemplary such bisphenol monomers include 4,4'-methylenebis(2,6-di-t-butylphenol), 2,2'-methylenebis(4-methyl-6-t-butylphenol), 4,4'-methylenebis (2,6-dimethylphenol), 4,4'butylidenebis(2-t-butyl-5-methylphenol), spirobiindane, bis-(hydroxy phenyl)-N-phenyl isoindolinone, and mixtures thereof.

Non-limiting examples of other comonomers or co-oligomers that may be used to advance the polyether polymer molecular weight (and may be used as the "primary" extender) include diacids such as adipic acid, azelaic acid, terephthalic acid, isophthalic acid, anhydrides thereof, and mixtures thereof, and diamines such as cyclohexane diamine, isophorone diamine, hexamethylene diamine, and mixtures thereof. Glycidyl ester compounds may also be used to advance the polyether polymer molecular weight. However, the use of glycidyl ester compounds may promote hydrolysis of coatings in contact with highly aggressive food products, and thus the use of glycidyl ester compounds and segments derived from glycidyl ester compounds preferably is avoided when making the polyether polymer.

Molecular weight advancement may also be enhanced by the use of a suitable catalyst in an amount sufficient to facilitate the desired reaction. Exemplary catalysts include amines, hydroxides (e.g., potassium hydroxide), phosphonium salts, and the like. A presently preferred catalyst is a phosphonium catalyst.

Depending upon the particular embodiment, the resulting polyether polymer may be amorphous or at least semi-crystalline. The polyether polymer may include branching, if desired. In preferred embodiments however, the polyether polymer is a linear or substantially linear polymer.

Depending on stoichiometry and order of addition, the polyether polymer may have terminal epoxy groups derived from the diepoxide; terminal hydroxyl groups derived from the polymer backbone extender; or terminal groups derived from other comonomers or co-oligomers if used. The various terminal groups may be reacted with a variety of other reactive materials to form desirable products. For example, epoxy-terminated polyether polymers may be reacted with polyamines or other epoxide-reactive crosslinkers to form thermoset compositions; with fatty acids to form curable polymers having unsaturated (e.g., air oxidizable) reactive groups; with acrylic acid or methacrylic acid to form free radically curable polymers; or with phosphoric or phosphonic acids to form phosphate esters. The types and amounts of reactants and conditions for such reactions will be familiar to persons having ordinary skill in the art.

The disclosed polyether polymers (or reaction products obtained from such polymers) may be applied to a variety of substrates as liquid coating compositions or as "solid" coating compositions (e.g., powder-based, extrusion or laminate coating compositions). Liquid coating compositions (typically including the polymer and a liquid carrier) may be preferred for many end uses, especially for use on heat-sensitive substrates or for substrates where an especially thin coating is desired. Exemplary liquid carriers include water, organic solvents, and mixtures of liquid carriers. Exemplary organic solvents include glycol ethers, alcohols, aromatic or aliphatic hydrocarbons, dibasic esters, ketones, esters, and the like. Preferably, such carriers are selected to provide a dispersion or solution of the polymer with which additional additives may be combined to provide a final coating formulation. In one embodiment, the disclosed liquid coating compositions are solvent-based systems that include no more than a de mininius amount of water (e.g., less than 2 wt. % of water). The disclosed solvent-based liquid coating compositions may for example contain at least 20 wt. % non-volatile components (viz., "solids"), and more preferably at least 25 wt. % non-volatile components. The disclosed solvent-based liquid coating compositions may also for example contain no greater than 50 wt. % non-volatile components, and more preferably no greater than 40 wt. % non-volatile components. For such an organic solvent-based composition, the non-volatile film-forming components preferably include at least 50 wt. % of the disclosed polyether polymer, more preferably at least 55 wt. % of the polymer, and even more preferably at least 60 wt. % of the polymer. For such an organic solvent-based composition, the non-volatile film-forming components preferably include no greater than 95 wt. % of the disclosed polyether polymer, and more preferably no greater than 85 wt. % of the polymer.

Water-based systems may be made for example as described in U.S. Pat. Nos. 3,943,187, 4,076,676, 4,212,781, 4,247,439, 4,285,847, 4,413,015, 4,446,258, 4,517,322, 4,963,602, 5,296,525, 5,527,840, 5,830,952, 5,922,817, 7,189,787 and 8,092,876 and in U.S. Patent Application Publication No. US 2005/0196629 A1. Water-based coating systems may optionally include one or more organic solvents, which will typically be selected to be miscible in water. The liquid carrier system of a water-based coating composition will typically include at least 50 wt. % water, more typically at least 75 wt. % water, and in some embodiments more than 90 wt. % or more than 95 wt. % water. Any suitable technique may be used to render the disclosed polymers miscible in water. For example, the polymer may include a suitable amount of salt groups such as ionic or cationic salt groups (or groups capable of forming such salt groups) to render the polymer miscible in water. Neutralized acid or base groups are preferred salt groups. For example, a water-dispersible polymer may be formed by combining an epoxy-terminated polymer and an acid-functional polymer in the presence of an amine or other suitable base (more preferably a tertiary amine). If desired, the acid-functional polymer may be combined with an amine (for example a tertiary amine) or other suitable base to at least partially neutralize the polymer prior to reaction with the epoxy-terminated polymer. In another embodiment, a water-dispersible free radically-polymerizable polymer may be formed by reacting an epoxy-terminated polymer with an ethylenically-unsaturated acidic monomer to form an acid-functional polymer, and then neutralizing the acid-functional polymer with, for example, an amine (preferably a tertiary amine) or other suitable base. If desired, an anhydride may be used in place of the acidic monomer. This will also provide acid functionality which, when combined with an amine or other suitable base to at least partially neutralize the acid functionality, will make the product water-dispersible.

The disclosed water-based compositions may for example contain at least 15 wt. % non-volatile components. The disclosed water-based compositions may also for example contain no greater than 50 wt. % non-volatile components, and more preferably no greater than 40 wt. % non-volatile components. For such a water-based composition, the non-volatile film-forming components preferably include at least 5 wt. % of the disclosed polyether polymer, more preferably at least 25 wt. % of the polymer, even more preferably at least 30 wt. % of the polymer, and optimally at least 40 wt. % of the polymer. For such a water-based composition, the non-volatile film forming components preferably include no greater than 70 wt. % of the disclosed polyether polymer, and more preferably no greater than 60 wt. % of the polymer.

The disclosed polymers may serve as a binder polymer in the disclosed coating compositions. The binder polymer amount may vary widely depending on a variety of considerations including the method of application, the presence of other film-forming materials, whether the coating composition is a water-based or solvent-based system, and so on. For liquid-based coating compositions, the binder polymer will typically constitute at least 10 wt. %, more typically at least 30 wt. %, and even more typically at least 50 wt. % of the coating composition, based on the total weight of resin solids in the coating composition. For such liquid-based coating compositions, the binder polymer will typically constitute less than about 90 wt. %, more typically less than about 85 wt. %, and even more typically less than about 70 wt. % of the coating composition, based on the total weight of resin solids in the coating composition.

Preferred coating compositions are substantially free of mobile BPA and mobile bisphenol A diglycidyl ether (BADGE), mobile bisphenol S (BPS) and mobile BPS diglycidyl ether, mobile bisphenol F (BPF) and mobile BPF diglycidyl ether, more preferably are essentially free of these compounds, and most preferably are completely free of these compounds. The disclosed coating composition (and more preferably each of the polymers and optional ingredients included therein) is also preferably substantially free of bound BPA, bound BADGE, bound BPS, bound BPS diglycidyl ether, bound BPF, and bound BPF diglycidyl ether, more preferably essentially free of these compounds, and most preferably completely free of these compounds.

As discussed above, in some embodiments the polymer, and more preferably the coating composition, does not include any structural units derived from a bisphenol monomer. By avoiding the inclusion of bisphenol monomers in the materials used to make preferred polymers of the present invention, there is no potential for any residual unreacted bisphenol monomer to be present in a composition containing the polyether polymer or to migrate from a coating formed from such composition.

Bisphenol monomers typically have a molecular weight of less than 500 Daltons, more typically less than 400 Daltons, and yet more typically less than 350 Daltons. Examples of bisphenol monomers include bisphenol A, bisphenol AP, bisphenol AF, bisphenol B, bisphenol BP, bisphenol C, bisphenol E, bisphenol F, bisphenol G, bisphenol I, bisphenol M, bisphenol P, bisphenol PH, bisphenol S, bisphenol TMC, bisphenol Z, 4,4'-(propane-2,2-diyl)bis(2,6-dibromophenol), 2,2-bis(4-hydroxyphenyl)propanoic acid, and the like. Bisphenol monomers are typically synthesized via reaction of a phenol compound with a ketone (e.g., formaldehyde, acetalaldehyde, acetone, cyclohexanone, acetophenone, and the like). For example, bisphenol A may be synthesized via reaction of two equivalents of phenol with one equivalent of acetone.

In some embodiments, the coating composition includes an acrylic component that may optionally be covalently attached to the polyether polymer. In some embodiments, the acrylic component may be present as a separate polymer blended with the polyether polymer (in addition to any acrylic component that may optionally be covalently attached to the polyether polymer). In certain water-based embodiments in which at least some of the acrylic component is covalently attached to the polyether polymer, at least a portion of the acrylic monomers used to form the acrylic component are preferably capable of rending the polyether polymer dispersible in water. In such embodiments, the acrylic component is preferably formed from an ethylenically unsaturated monomer mixture that includes one or more $\alpha,\beta$-unsaturated carboxylic acids.

The coating composition may include any amount of acrylic component suitable to produce the desired film or coating properties. In some acrylic-component-containing embodiments, the coating composition includes an amount of acrylic component of at least about 5 wt. %, more preferably at least about 10 wt. %, and even more preferably at least about 15 wt. %, as determined based on the weight of the monomer mixture used to prepare the acrylic component compared to the total weight of resin solids in the coating system. In such embodiments, the coating composition preferably includes less than about 95 wt. %, more preferably less than about 75 wt. %, and even more preferably less than about 30 to 40 wt. % acrylic component.

In some embodiments, the polymer is a water-dispersible copolymer including both one or more polyether portions and one or more acrylic portions. For example, a water-dispersible polymer may be formed having the structure E-L-A, wherein E is an epoxy portion of the polymer formed from a polyether polymer described herein, A is a polymerized acrylic portion of the polymer, and L is a linking portion of the polymer that covalently links E to A. Such a polymer can be prepared, for example, from (a) a polyether polymer described herein preferably having about two epoxy groups, (b) an unsaturated linking compound preferably having (i) a non-aromatic carbon-carbon double bond, non-aromatic conjugated carbon-carbon double bonds or a carbon-carbon triple bond and (ii) a functional group capable of reacting with an epoxy group (e.g., a carboxylic group, a hydroxyl group, an amino group, an amido group, a mercapto group, or other epoxy-reactive groups that will be familiar to persons having ordinary skill in the art). Preferred linking compounds include 12 or fewer carbon atoms, with sorbic acid being an example of a preferred such linking compound. The acrylic portion preferably includes one or more salt groups or salt-forming groups (e.g., acid groups such as are present in $\alpha,\beta$-ethylenically saturated carboxylic acid monomers). Such E-L-A polymers may be formed, for example, using a polyether polymer of the present invention in combination with the materials and techniques disclosed in U.S. Pat. No. 5,830,952 (Pedersen et al.) or U.S. Patent Application Publication No. 2010/0068433 A1 (Gibanel et al.).

When the disclosed coating compositions include polymers having suitable reactive groups (for example, epoxy groups, phenoxy groups or ethylenically unsaturated groups), the coating composition preferably also is formulated using one or more optional curing agents (for example, crosslinking resins, sometimes referred to as "crosslinkers"). The choice of a particular crosslinker typically depends on the particular product being formulated. For example, some coating compositions are highly colored (e.g., gold-colored colored coatings). These coatings may typically be formulated using crosslinkers that themselves tend to have a yellowish color. In contrast, white coatings are generally formulated using non-yellow or non-yellowing crosslinkers, or only a small amount of a yellow or yellowing crosslinker. Suitable examples of such curing agents for use with phenoxy group-containing polymers include hydroxyl-reactive curing resins such as phenoplasts, aminoplast, blocked or unblocked isocyanates, or mixtures thereof.

Exemplary phenoplast resins include the condensation products of aldehydes with phenols. Formaldehyde and acetaldehyde are preferred aldehydes. Various phenols can be employed including phenol, cresol, p-phenylphenol, p-tert-butylphenol, p-tert-amylphenol and cyclopentylphenol.

Exemplary aminoplast resins are the condensation products of aldehydes such as formaldehyde, acetaldehyde, crotonaldehyde, and benzaldehyde with amino- or amido-group-containing substances such as urea, melamine, and benzoguanamine. Examples of suitable aminoplast crosslinking resins include, without limitation, benzoguanamine-formaldehyde resins, melamine-formaldehyde resins, etherified melamine-formaldehyde, and urea-formaldehyde resins.

Exemplary other generally suitable curing agents include blocked or non-blocked aliphatic, cycloaliphatic or aromatic di-, tri-, or poly-valent isocyanates, such as hexamethylene diisocyanate, cyclohexyl-1,4-diisocyanate, and the like. Further non-limiting examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates having an Mn of at least about 300, more preferably at least about 650, and even more preferably at least about 1,000 may be used. Polymeric blocked isocyanates are useful in certain embodiments.

The level of curing agent (viz., crosslinker) used will typically depend on the type of curing agent, the time and temperature of the bake, and the molecular weight of the binder polymer. If used, the crosslinker is typically present in an amount of up to 50 wt. %, preferably up to 30 wt. %, and more preferably up to 15 wt. % based on the total weight of the resin solids in the coating composition. If used, a crosslinker is preferably present in an amount of at least 0.1 wt. %, more preferably at least 1 wt. %, and even more preferably at least 1.5 wt. % based upon the total resin solids weight.

The disclosed coating compositions may also include other optional polymers that do not adversely affect the coating composition or a cured coating thereof. Such optional polymers are typically included as a nonreactive filler material, although they may be included as a reactive crosslinker, or to provide other desired properties. Such optional nonreactive filler polymers include, for example, polyesters, acrylics, polyamides, polyethers, and novalacs. Alternatively, such additional polymeric materials or monomers may be reactive with other components of the composition (e.g., an acid-functional or unsaturated polymer). If desired, reactive polymers may be incorporated into the disclosed compositions, for example to provide additional functionality for various purposes, including crosslinking or to assist in dispersing the disclosed polyether polymers into water. Examples of such reactive polymers include, for example, functionalized polyesters, acrylics, polyamides, and polyethers.

Another preferred optional ingredient is a catalyst to increase the rate of cure. Examples of catalysts, include, but are not limited to, strong acids including phosphoric acid, dodecylbenzene sulfonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid; quaternary ammonium compounds; phosphorous compounds; and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons having ordinary skill in the art. If used, a catalyst is preferably present in an amount of at least 0.01 wt. %, and more preferably at least 0.1 wt. %, based on the weight of nonvolatile material in the coating composition. If used, a catalyst is preferably present in an amount of no greater than 3 wt. %, and more preferably no greater than 1 wt. %, based on the weight of nonvolatile material in the coating composition.

Another useful optional ingredient is a lubricant (e.g., a wax), which facilitates manufacture of fabricated metal articles (e.g., container closures and food or beverage can ends) by imparting lubricity to sheets of coated metal substrate. Non-limiting examples of suitable lubricants include, for example, natural waxes such as Carnauba wax or lanolin wax, polytetrafluoroethane (PTFE) and polyethylene-type lubricants. If used, a lubricant is preferably present in the coating composition in an amount of at least 0.1 wt. %, and preferably no greater than 2 wt. %, and more preferably no greater than 1 wt. %, based on the total weight of nonvolatile material in the coating composition.

Another useful optional ingredient is a pigment, such as titanium dioxide. If used, a pigment is present in the disclosed coating composition in an amount of no greater than 70 wt. %, more preferably no greater than 50 wt. %, and even more preferably no greater than 40 wt. %, based on the total weight of solids in the coating composition.

Surfactants may optionally be added to the disclosed coating composition to aid in flow and wetting of a substrate. Examples of surfactants include, but are not limited to, nonylphenol polyethers and salts and similar surfactants known to persons having ordinary skill in the art. If used, a surfactant is preferably present in an amount of at least 0.01 wt. %, and more preferably at least 0.1 wt. %, based on the weight of resin solids. If used, a surfactant is preferably present in an amount no greater than 10 wt. %, and more preferably no greater than 5 wt. %, based on the weight of resin solids.

The disclosed coating compositions may also include other optional ingredients that do not adversely affect the coating composition or cured coating thereof. Such optional ingredients are typically included in a coating composition to enhance composition esthetics; to facilitate manufacturing, processing, handling, or application of the composition;

or to further improve a particular functional property of a coating composition or a cured coating thereof. For example, the disclosed coating compositions may optionally include fillers other than those already mentioned, dyes, colorants, toners, coalescents, extenders, anticorrosion agents, flow control agents, thixotropic agents, dispersing agents, antioxidants, oxygen-scavenging materials, adhesion promoters, light stabilizers, and mixtures thereof as required to provide desired film properties. Each optional ingredient is preferably included in a sufficient amount to serve its intended purpose, but not in such an amount to adversely affect a coating composition or a cured coating thereof.

The disclosed polyether polymers and coating compositions preferably are substantially free, essentially free, essentially completely free or completely free of halogen atoms, sulfur atoms (e.g., sulfides), chromates or other materials that might impart an off-taste to food or beverages, cause migration of dangerous or potentially dangerous additives into a food or beverage, or otherwise render the disclosed coating compositions unsuitable for use in packaging foods and beverages.

The disclosed coating compositions may be present as a layer of a mono-layer coating system or as one or more layers of a multi-layer coating system. The coating composition can be used as a primer coat, an intermediate coat, a top coat, or a combination thereof. The coating thickness of a particular layer and of the overall coating system will vary depending upon the coating material used, the substrate, the coating application method, and the end use for the coated article. Mono-layer or multi-layer coating systems including one or more layers formed from the disclosed coating composition may have any suitable overall coating thickness, but will typically have an overall average dry coating thickness of from about 1 to about 60 micrometers and more typically from about 2 to about 15 micrometers. Typically, the average total coating thickness for rigid metal food or beverage can applications will be about 3 to about 10 micrometers. Coating systems for use on closures (e.g., twist-off metal closures) for food or beverage containers may have an average total coating thickness up to about 15 micrometers. In certain embodiments in which the coating composition is used as an interior coating on a drum (e.g., a drum for use with food or beverage products), the total coating thickness may be approximately 25 micrometers.

The metal substrate used in forming rigid food or beverage cans, or portions thereof, typically has a thickness in the range of about 125 micrometers to about 635 micrometers. Electro tinplated steel, cold-rolled steel and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The disclosed coating compositions may be applied to a substrate either prior to, or after, the substrate is formed into an article such as, for example, a food or beverage container or a portion thereof. In one embodiment, a method of forming food or beverage cans is provided that includes: applying a coating composition described herein to a metal substrate (e.g., applying the composition to the metal substrate in the form of a planar coil or sheet), hardening the composition, and forming (e.g., via stamping) the substrate into a packaging container or a portion thereof (e.g., a food or beverage can or a portion thereof). For example, two-piece or three-piece cans or portions thereof such as riveted beverage can ends (e.g., soda or beer cans) with a cured coating of the disclosed coating composition on a surface thereof can be formed in such a method. In another embodiment, a method of forming food or beverage cans is provided that includes: forming (e.g., via stamping) a metal substrate into a packaging container or a portion thereof (e.g., a food or beverage can or a portion thereof), applying a coating composition described herein to the inside, outside or both inside and outside portions of such packaging container or a portion thereof, and hardening the composition. The disclosed polyether polymers are especially desirable for use on the inside or interior portion of such food or beverage containers, and for other applications involving prolonged food or beverage contact with a metal substrate. Exemplary such applications include two-piece drawn food cans, three-piece food cans, food can ends, drawn and ironed food or beverage cans, beverage can ends, easy open can ends, twist-off closure lids, and the like.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely uncrosslinked state. The coated substrates can then be heated to fully cure the compositions. In certain instances, the disclosed coating compositions may be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If a metal coil is the substrate to be coated, curing of the applied coating composition may be conducted, for example, by heating the coated metal substrate over a suitable time period to a peak metal temperature ("PMT") of preferably greater than about 177° C. More preferably, the coated metal coil is heated for a suitable time period (e.g., about 5 to 900 seconds) to a PMT of at least about 218° C.

The following examples are offered to aid in understanding of the present invention and are not to be construed as limiting the scope thereof. Unless otherwise indicated, all parts and percentages are by weight. Polymers such as those described in the Examples may be evaluated using a variety of tests including:

Differential Scanning Calorimetry

Samples for differential scanning calorimetry ("DSC") testing are prepared by first applying a liquid resin composition containing the polymer of interest onto aluminum sheet panels. The panels are baked in a Fisher ISOTEMP™ electric oven for 20 minutes at 149° C. to remove volatile materials. After cooling to room temperature, the samples are scraped from the panels, weighed into standard sample pans and analyzed using a standard DSC heat-cool-heat method in which the samples are equilibrated at −60° C., then heated at 20° C. per minute to 200° C., cooled to −60° C., and then heated again at 20° C. per minute to 200° C. Tg values are calculated from a thermogram of the last heat cycle, with Tg being measured at the inflection point of the transition.

Solvent Resistance

The extent of "cure" or crosslinking of a coating may be measured as a resistance to solvents, such as methyl ethyl ketone (MEK) or isopropyl alcohol (IPA). This test is performed as described in ASTM D5402-93. The number of double-rubs (i.e., one back- and forth motion) is reported.

Global Extraction

The global extraction test is designed to estimate the total amount of mobile material that can potentially migrate out of a coating and into food packed in a coated can. Typically a coated substrate is subjected to water or solvent blends under a variety of conditions to simulate a given end use.

Extraction may for example be evaluated using the procedures described in European Union Commission Directives 82/711/EEC, 93/8/EEC and 97/48/EC, and using 3% acetic acid (weight/volume) as a simulant for aqueous and acidic foodstuffs, and 10, 50 and 95 volume percent ethanol solutions as respective simulants for alcoholic foodstuffs, milky foodstuffs and fatty foodstuffs. Coated panels are cut into 2×12.5 cm strips. The strips are folded in half and placed in a 125 mL glass jar. At least two samples are evaluated for each test. The jars are filled with 100 mL of food simulant solution, covered with polytetrafluoroethylene film in sealed with plastic caps. The jars and a similar weighed control jar containing food simulant solution but no coated panel strip are placed in an oven or autoclave for the time periods specified in the Directive, then removed and cooled. The simulant solutions are transferred to clean, weighed 125 mL glass jars and the solutions are evaporated to dryness. The measured residue for the control solution is subtracted from the measured residue for the test sample and the migration in milligrams per $dm^2$ of coating is calculated.

Extraction may also be evaluated using the procedure described in 21 CFR section 175.300, paragraph (e) (4) (xv) but with modifications according to the FDA publication "Guidelines for Industry" for preparation of Food Contact Notifications, to ensure worst-case scenario performance: 1) the alcohol content is increased to 10% by weight and 2) the filled containers are held for a 10-day equilibrium period at 37.8° C. The coated beverage can is filled with 10 wt. % aqueous ethanol and subjected to pasteurization conditions (65.6° C.) for 2 hours, followed by a 10-day equilibrium period at 37.8° C. Determination of the amount of extractives is determined as described in 21 CFR section 175.300, paragraph (e) (5), and ppm values are calculated based on surface area of the can (no end) of 283.9 $cm^2$ with a volume of 355 milliliters (ml). Preferred coatings give global extraction results of less than 50 ppm, more preferred results of less than 10 ppm, and even more preferred results of less than 1 ppm. Most preferably, the global extraction results are optimally non-detectable.

Adhesion

Adhesion testing may be performed to assess whether the coating adheres to the coated substrate. The adhesion test is performed according to ASTM D3359, Test Method B, using SCOTCH™ 610 tape (available from 3M Company of Saint Paul, Minn.). Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Blush ratings of at least 7 are typically desired for commercially viable coatings and optimally 9 or above.

Process or Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. Testing is accomplished by subjecting the coated substrate to heat ranging from 105° C. to 130° C. and pressure ranging from 0.7 $kg/cm^2$ to 1.05 $kg/cm^2$ for a period of 15 minutes to 90 minutes. For the present evaluation, the coated substrate may be immersed in deionized water and subjected to heat of 121° C. and pressure of 1.05 $kg/cm^2$ for a period of 90 minutes. The coated substrate may then be tested for adhesion and blush as described above. In food or beverage applications requiring retort performance, adhesion ratings of 10 and blush ratings of at least 7 are typically desired for commercially viable coatings.

Crazing—Reverse Impact Resistance

Reverse impact resistance measures the ability of a coated substrate to withstand the deformation encountered when impacted by a steel punch with a hemispherical head. For the present evaluation, a coated substrate may be subjected to 6.35 N-m of force using a BYK-GARDNER™ "overall" Bend and Impact Tester (available from Byk-Gardner, Inc.) and rated visually for micro-cracking or micro-fracturing—commonly referred to as crazing. Test pieces are impacted on the uncoated or reverse side. A rating of 10 indicates no craze and suggests sufficient flexibility and cure. A rating of 0 indicates complete failure. Commercially viable coatings preferably show slight or no crazing on a reverse impact test.

206 End Fabrication

This test is a measure of fabrication ability of a coating. Standard size 206 can ends are formed in a press from coated steel plate. The ends are evaluated for initial failure. The ends are then soaked for 10 minutes in a copper sulfate solution containing 69 parts deionized water, 20 parts anhydrous copper sulfate, 10 parts concentrated hydrochloric acid and 1 part DOWFAX™ 2A1 surfactant (available from Dow Chemical Company). The percentage of the end circumference that is uncorroded is recorded.

Food Simulant Tests

The resistance properties of stamped standard size 202 ends formed from coated plate were evaluated by processing (retorting) them in three food simulants for 60 minutes at 121° C. and 1.05 $kg/cm^2$. The three food simulants were deionized water, a 1% by weight solution of lactic acid in deionized water and a solution of 2% sodium chloride and 3% acetic acid by weight in deionized water. An additional simulant, 2% sodium chloride in deionized water, is processed for 90 minutes at 121° C. and 1.05 $kg/cm^2$. Adhesion tests are performed as described above. Blush and corrosion are rated visually.

Example 1

Reactions of Diepoxides with Polymer Backbone Extenders

In a series of runs, the diglycidyl ether ("DGE") compounds and polymer backbone extenders shown below in Table I can be reacted to provide a polyether polymer having at least one pendant aryl or heteroaryl group on the polymer backbone:

TABLE 1

| Run No. | Diglycidyl Ether | Polymer Backbone Extender |
| --- | --- | --- |
| 1-1 | 1-phenyl-1,2-ethanol diglycidyl ether | 1-phenyl-1,2-ethanediol |
| 1-2 | 1-phenyl-1,2-ethanol diglycidyl ether | hydroquinone |
| 1-3 | 1-phenyl-1,2-ethanol diglycidyl ether | 4,4'-methylenebis(2,6-dimethylphenol) |
| 1-4 | 2-phenyl-1,2-propanol diglycidyl ether | 2-phenyl-1,2-propanediol |
| 1-5 | 2-phenyl-1,2-propanol diglycidyl ether | hydroquinone |
| 1-6 | 2-phenyl-1,2-propanol diglycidyl ether | 4,4'-methylenebis(2,6-dimethylphenol) |
| 1-7 | 2-phenyl-1,3-propanol diglycidyl ether | 2-phenyl-1,3-propanediol |
| 1-8 | 2-phenyl-1,3-propanol diglycidyl ether | hydroquinone |
| 1-9 | 2-phenyl-1,3-propanol diglycidyl ether | 4,4'-methylenebis(2,6-dimethylphenol) |
| 1-10 | 1-phenyl-1,2-propanol diglycidyl ether | 1-phenyl-1,2-propanediol |
| 1-11 | 1-phenyl-1,2-propanol diglycidyl ether | hydroquinone |
| 1-12 | 1-phenyl-1,2-propanol diglycidyl ether | 4,4'-methylenebis(2,6-dimethylphenol) |
| 1-13 | 1-phenyl-1,3-propanol diglycidyl ether | 1-phenyl-1,3-propanediol |
| 1-14 | 1-phenyl-1,3-propanol diglycidyl ether | hydroquinone |
| 1-15 | 1-phenyl-1,3-propanol diglycidyl ether | 4,4'-methylenebis(2,6-dimethylphenol) |

Example 2

Additional Reactions of Diepoxides with Polymer Backbone Extenders

In a series of runs, the DGE compounds and polymer backbone extenders shown below in Table II can be reacted to provide a polyether having at least one aryl or heteroaryl group in the polymer backbone and linked to the backbone via ether linkages:

TABLE 2

| Run No. | Diglycidyl Ether | Polymer Backbone Extender |
| --- | --- | --- |
| 2-1 | 1,2-benzenedimethanol diglycidyl ether | 1,2-benzenedimethanol |
| 2-2 | 1,2-benzenedimethanol diglycidyl ether | hydroquinone |
| 2-3 | 1,2-benzenedimethanol diglycidyl ether | 4,4'-methylenebis(2,6-dimethylphenol) |
| 2-4 | 1,3-benzenedimethanol diglycidyl ether | 1,3-benzenedimethanol |
| 2-5 | 1,3-benzenedimethanol diglycidyl ether | hydroquinone |
| 2-6 | 1,3-benzenedimethanol diglycidyl ether | 4,4'-methylenebis(2,6-dimethylphenol) |
| 2-7 | 1,4-benzenedimethanol diglycidyl ether | 1,4-benzenedimethanol |
| 2-8 | 1,4-benzenedimethanol diglycidyl ether | hydroquinone |
| 2-9 | 1,4-benzenedimethanol diglycidyl ether | 4,4'-methylenebis(2,6-dimethylphenol) |
| 2-10 | 1,4-benzenediethanol diglycidyl ether | 1,4-benzenediethanol |
| 2-11 | 1,4-benzenediethanol diglycidyl ether | hydroquinone |
| 2-12 | 1,4-benzenediethanol diglycidyl ether | 4,4'-methylenebis(2,6-dimethylphenol) |
| 2-13 | 1,3-benzenedipropanol diglycidyl ether | 1,3-benzenedipropanol |
| 2-14 | 1,3-benzenedipropanol diglycidyl ether | hydroquinone |
| 2-15 | 1,3-benzenedipropanol diglycidyl ether | 4,4'-methylenebis(2,6-dimethylphenol) |
| 2-16 | 1,4-benzenedipropanol diglycidyl ether | 1,4-benzenedipropanol |
| 2-17 | 1,4-benzenedipropanol diglycidyl ether | hydroquinone |
| 2-18 | 1,4-benzenedipropanol diglycidyl ether | 4,4'-methylenebis(2,6-dimethylphenol) |
| 2-19 | 2-(4-hydroxyphenyl)ethanol diglycidyl ether | 2-(4-hydroxyphenyl)ethanol |
| 2-20 | 2-(4-hydroxyphenyl)ethanol diglycidyl ether | hydroquinone |
| 2-21 | 2-(4-hydroxyphenyl)ethanol diglycidyl ether | 4,4'-methylenebis(2,6-dimethylphenol) |
| 2-22 | 2-(3-hydroxyphenyl)ethane diglycidyl ether | 2-(3-hydroxyphenyl)ethanol |
| 2-23 | 2-(3-hydroxyphenyl)ethane diglycidyl ether | hydroquinone |
| 2-24 | 2-(3-hydroxyphenyl)ethane diglycidyl ether | 4,4'-methylenebis(2,6-dimethylphenol) |
| 2-25 | 2-hydroxyphenethyl alcohol diglycidyl ether | 2-hydroxyphenethyl alcohol |
| 2-26 | 2-hydroxyphenethyl alcohol diglycidyl ether | hydroquinone |
| 2-27 | 2-hydroxyphenethyl alcohol diglycidyl ether | 4,4'-methylenebis(2,6-dimethylphenol) |
| 2-28 | 2-hydroxyphenylacetic acid diglycidyl ether | 2-hydroxyphenylacetic acid |
| 2-29 | 2-hydroxyphenylacetic acid diglycidyl ether | hydroquinone |
| 2-30 | 2-hydroxyphenylacetic acid diglycidyl ether | 4,4'-methylenebis(2,6-dimethylphenol) |
| 2-31 | 2-hydroxyphenylacetic acid diglycidyl ether | coumarin |
| 2-32 | 4-hydroxy-3,5-dimethoxy-benzoic acid diglycidyl ether | 4-hydroxy-3,5-dimethoxy-benzoic acid |
| 2-33 | 4-hydroxy-3,5-dimethoxy-benzoic acid diglycidyl ether | hydroquinone |
| 2-34 | 4-hydroxy-3,5-dimethoxy-benzoic acid diglycidyl ether | 4,4'-methylenebis(2,6-dimethylphenol) |
| 2-35 | 4,4'-(1,4-phenylene)bis(4-methyl-2-pentane) diglycidyl ether | 4,4'-(1,4-phenylene)bis(4-methyl-2-pentanol) |
| 2-36 | 4,4'-(1,4-phenylene)bis(4-methyl-2-pentane) diglycidyl ether | hydroquinone |
| 2-37 | 4,4'-(1,4-phenylene)bis(4-methyl-2-pentane) diglycidyl ether | 4,4'-methylenebis(2,6-dimethylphenol) |

Example 3

Coating Compositions

To produce the coating compositions of Example 3, each of the polyether polymers of Example 1, Run Nos. 1 to 6 and Example 2, Run Nos. 1 to 13 is cut to a nonvolatile content of 35% using a 1:1 weight ratio mixture of cyclohexane and AROMATIC 150™ solvent. Then 20% solids on solids of PHENODUR™ PR 612 crosslinker from Cytec Surface Specialties are added, followed by 0.1% $H_3PO_4$ solids on solids added as a 10% solution in butanol. The resulting acid-catalyzed 80/20 polyether/phenolic formulations may be coated onto metal substrates, for example, 0.25 gauge 75# tinplate ("ETP") and 75# tin-free steel ("TFS"). Coating may be performed using an appropriately-sized wire wound bar coater to provide coatings that after drying will have a dry film thickness of about 7-7.8 gm/m². The coating compositions may be baked to cure the coating, at for example 403° F. (~206° C.) for 12 minutes in a gas-fired, forced-draft box oven.

No. 202 sanitary food can ends may be formed from the coated plates. Each can end may be given a 1.6 N-m (14 inch-pound) reverse impact test using a 0.9 Kg (two pound) weight dropped from an appropriate height onto the center of the uncoated side of the end. The ends may also be immersed in aggressive food products having an initial temperature of 180° F. (82° C.) and stored for 2 weeks at 120° F. (~49° C.). After 2 weeks the ends may be removed from the food product, rinsed with water, and evaluated for adhesion, corrosion, stain, and blush.

Example 4

Synthesis of the Diglycidyl Ether of Vanillyl Alcohol

The following ingredients were loaded into a flask equipped with a total condenser and a stirrer: 75 grams (0.48651 moles) of vanillyl alcohol (CAS No. 498-00-0), 450.12 grams (4.865 moles) of epichlorohydrin (CAS No. 106-89-8), and 11.08 grams (0.04865 moles) of benzyltriethylammonium chloride (CAS No. 56-37-1). The mixture was stirred for four hours at room temperature. The temperature of the product was decreased to 0° C. and under strong agitation a solution of 291.9 grams (7.298 moles) of NaOH in 583.8 grams of water was added. While under strong agitation, the temperature was maintained at 0° C. for one hour and then at 15-20° C. for eight hours.

To isolate and wash the organic phase, 200 ml of water and 500 ml of trichloromethane were added. Water was removed after separation. The organic solution was washed again by addition of 200 ml of water. After separation, the organic phase was dried with anhydrous sodium sulfate. After filtration, the solvent was evaporated and 122 grams of yellow viscous liquid product were obtained in 94.5% yield. The product was identified by nuclear magnetic resonance (NMR) spectroscopy and confirmed by mass spectrometry as being the diglycidyl ether of vanillyl alcohol, and having Formula VIII shown below:

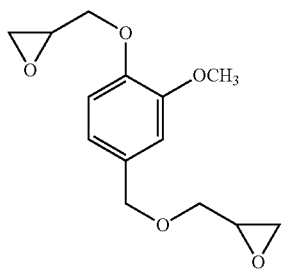

VIII

This diglycidyl ether can be reacted with any of the polymer backbone extenders shown in Table 1 to provide a polyether polymer which can be used to formulate a coating composition as described in, e.g., Example 3.

Example 5

Synthesis of the Diglycidyl Ether of 1,4-benzenedimethanol

Using the procedure set out in Hu et al, *Synthesis and Characterization of Thermosetting Furan-Based Epoxy Systems*, Macromolecules 2014, 47, 3332-3342, 3335 (May 9, 2014), the diglycidyl ether of 1,4-benzenedimethanol (Run No. 2-7) was prepared. The product had Formula IX shown below:

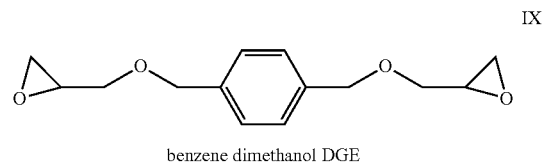 [SMILES: c1cc(COCC2CO2)ccc1COCC1CO1]

IX benzene dimethanol DGE

This diglycidyl ether can be reacted with any of the polymer backbone extenders shown in Table 1 to provide a polyether polymer which can be used to formulate a coating composition as described in, e.g., Example 3.

Example 6

Synthesis of the Diglycidyl Ether of 2,5-furandimethanol

Using the procedure set out in Hu et al, id. at 3335, the diglycidyl ether of 2,5-furandimethanol was prepared. The product had Formula X shown below:

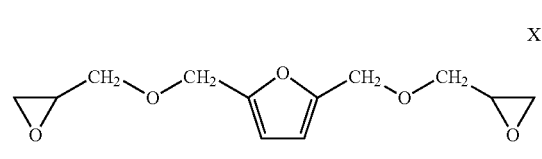

X furane dimethanol DGE

This diglycidyl ether can be reacted with any of the polymer backbone extenders shown in Table 1 to provide a polyether polymer which can be used to formulate a coating composition as described in, e.g., Example 3, Example 7

Reaction of the Diglycidyl Ether of Vanillyl Alcohol with Polymer Backbone Extenders In a 0.25 liter glass reactor equipped with a stirrer, a total condenser, and a nitrogen flow, the ingredients listed below in Table 3 were loaded and heated under stirring and nitrogen at 140° C. At 140° C., the catalyst was added. The temperature was slowly increased to 170° C. Following an exotherm, the temperature increased to 180° C. The products were maintained at this temperature until the epoxy equivalent weights reached the theoretical values shown below. After cooling, thinners were added.

TABLE 3

|  | Comparative Run (parts) | Run 1 (parts) |
|---|---|---|
| Diglycidyl ether of vanillyl alcohol (Example 4) | 50 | 50 |
| Bisphenol A | 38.2 | 0 |
| 4,4'-Methylenebis(2,6-dimethylphenol) | 0 | 42.7 |
| Phosphonium catalyst | 0.04 | 0 |
| Amine catalyst | 0 | 0.3 |
| Theoretical Epoxy Equivalent Weight, g | 3,508 | 3,430 |
| Measured Epoxy Equivalent Weight, g | 3,650 | 4,012 |

Example 8

Reaction of a Diepoxide Having a Pendant Aryl Group with a Polymer Backbone Extender In a 0.25 liter glass reactor equipped with a stirrer, a total condenser, and a nitrogen flow, the ingredients listed below in Table 4 were loaded and heated under stirring and nitrogen at 140° C. At 140° C., the amino catalyst was added. The temperature was slowly increased to 170° C. Following an exotherm, the temperature increased to 190° C. The product, a polyether polymer, was maintained at this temperature until the epoxy equivalent weight reached the theoretical value shown below. After cooling at 160° C., thinners were added.

TABLE 4

|  | Run 1 (parts) |
|---|---|
| Diepoxide having a pendent aryl group | 50 |
| 4,4'-methylenebis(2,6-dimethylphenol) | 38.6 |
| Amino catalyst | 0.18 |
| SOLVESSO ™ 150 solvent (ExxonMobil) | 59.2 |
| Methoxy propyl acetate (DOWANOL ™ PMA, Dow Chemical Co.) | 29.6 |
| Theoretical Epoxy Equivalent Weight | 3,463 |
| Measured Epoxy Equivalent Weight | 3,549 |
| Viscosity (falling ball) −25° C. | 12.6 P |
| Non-volatile content (1 gram, 30 minutes, 180° C.) | 49.7% |

Example 9

Coating Compositions

Coating compositions were prepared using the ingredients listed below in Table 5. While under stirring, the catalyst premix was added to the polyether polymer of Example 8. After homogenization, the phenolic resin(s) were added. After 15 minutes under agitation, the viscosity was adjusted to 80-100 sec Afnor 4 (20° C.) with the solvent mixture. Twenty four hours later, the resulting varnishes were coated on tin plate substrates (2,8/2,8) and the coated substrates were placed in a 200° C. electrical ventilated oven for 10 minutes to yield cured coatings having an average dry film thickness of 5 to 7 grams per square meter.

TABLE 5

|  | Run 1 (parts) | Run 2 (parts) |
|---|---|---|
| Example 8 polyether polymer | 68.2 | 68.2 |
| Resole phenolic crosslinker(s) | 23 | 11.35 |
| Xylene/Butanol/H$_3$PO$_4$ 10% in propylene glycol methyl ether | 6.5/3/0.75 | 6.5/3/0.75 |
| Xylene/Butanol | 7.1/3.5 | 6.8/3.2 |

The cured coatings of Example 9 were then subjected to a variety of coating property tests, the results of which are reported below in Table 6.

TABLE 6

|  | Run 1 Coating | Run 2 Coating |
|---|---|---|
| MEK Solvent Resistance (number of double rubs) | 95 | 87 |
| Wedge bend (% of coating not torn) | 85.6% | 86 |
| Porosity before retort | 32 milliamps | 22 milliamps |
| Porosity after water retort | 45 milliamps | 34 milliamps |
| Porosity after retort in 3% aqueous acetic acid solution | 43 milliamps | 28 milliamps |
| Porosity after retort in 1% aqueous NaCl solution | 49 milliamps | 26 milliamps |

Having thus described preferred embodiments of the present invention, those of skill in the art will readily appreciate that the teachings found herein may be applied to yet other embodiments within the scope of the claims hereto attached. The complete disclosure of all listed patents, patent documents and publications (including material safety data sheets, technical data sheets and product brochures for the raw materials and ingredients used in the Examples) are incorporated herein by reference as if individually incorporated.

We claim:

1. An article comprising a food or beverage container, or a portion thereof, having a metal substrate and a food-contact coating applied on at least a portion of the metal substrate, wherein the coating is formed from a coating composition that includes a polyether polymer having a polymer backbone, wherein the polymer contains at least two ether linkages in the polymer backbone; is substantially free of segments derived from bisphenol A and epoxides thereof; and is a reaction product of, or can be derived from, reactants including:
   (i) an aryl- or heteroaryl-group-containing diepoxide that is not derived from a polyhydric phenol or a glycidyl ester; and
   (ii) a polymer backbone extender, wherein the extender:
      (a) has two functional groups reactive with an epoxy group; and
      (b) provides, following reaction with the diepoxide:
         (i) at least one pendant aryl or heteroaryl group on the polymer backbone, or
         (ii) at least one divalent aryl or heteroaryl group in the polymer backbone and linked to the backbone via ether linkages,
   wherein the diepoxide is one or more of the diglycidyl ether of 1,2-benzenedimethanol, the diglycidyl ether of 1,3-benzenedimethanol, the diglycidyl ether of 1,4-benzenedimethanol, the diglycidyl ether of 1,4-benzenediethanol, the diglycidyl ether of 1,3-benzenedipropanol, the diglycidyl ether of 1,4-benzenedipropanol, the diglycidyl ether of 2-(4- hydroxyphenyl)ethanol, the diglycidyl ether of 4,4'-(1,4-phenylene)bis(4-methyl-2-pentanol), the diglycidyl ether of 2-(3-hydroxyphenyl)ethanol, the diglycidyl ether of 2-hydroxyphenethyl alcohol, the diglycidyl ether of 1-phenyl-1,2-propanediol, the diglycidyl ether of 2-phenyl-1,2-propanediol, the diglycidyl ether of 1-phenyl-1,3-propanediol, the diglycidyl ether of 2-phenyl-1,3-propanediol, the diglycidyl ether of 1-phenyl-1,2-ethanediol, or the diglycidyl ether of vanillyl alcohol, the diglycidyl ether of 2,5-furandimethanol.

2. The article of claim 1, wherein the diepoxide provides a pendant aryl or heteroaryl group on the polymer backbone.

3. The article of claim 1, wherein the diepoxide provides an aryl or heteroaryl group in the polymer backbone and linked to it via ether linkages.

4. The article of claim 1, wherein the aryl or heteroaryl groups of the diepoxide and the extender are nonphenolic.

5. The article of claim 1, wherein the diepoxide is derived from a compound having:
a single phenyl hydroxyl group; and
an alcohol or acid functional group that is not a phenyl hydroxyl group and is capable of reacting with epichlorohydrin to provide an epoxide group.

6. The article of claim 1, wherein the polymer has a number average molecular weight of at least 2,000.

7. The article of claim 1, wherein the polymer has a Tg of at least 30° C.

8. The article of claim 1, wherein the diepoxide compound does not include ester linkages.

9. The article of claim 1, wherein the extender includes a segment of Formula I or Formula IV shown below:

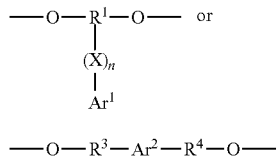

wherein:
each depicted oxygen atom in Formula I is present in an ether linkage;
$R^1$ is a trivalent organic group having from 1 to 10 carbon atoms;
X is a divalent organic group having from 1 to 10 carbon atoms, an oxygen atom, a sulfur atom, or a nitrogen-containing group;
n is 0 or 1;
$Ar^1$ is an aryl or heteroaryl group which does not contain a bisphenol monomer segment;
the terminal oxygen atoms attached to $R^3$ and $R^4$ in Formula IV are present in ether linkages;
$R^3$ and $R^4$ independently are each divalent organic groups having from 1 to 10 carbon atoms; and
$Ar^2$ is a divalent nonphenolic aryl or heteroaryl group which does not contain a bisphenol monomer segment.

10. The article of claim 1, wherein the polyether polymer is substantially free of segments derived from bisphenol monomers or epoxides of bisphenol monomers.

11. The article of claim 1, wherein the polyether polymer is free of halogen atoms.

12. The article of claim 1, wherein the backbone of the polyether polymer is free of ester linkages.

13. The article of claim 1, wherein the coating composition is solvent-based and contains at least 20 wt. % nonvolatile components, based on total resin solids.

14. The article of claim 1, wherein the coating composition is water-based and contains at least 50 wt. % water.

15. The article of claim 1, wherein the coating composition includes a crosslinker.

16. The article of claim 1, wherein the polyether polymer contains furanylene heteroaryl groups.

17. An article comprising a food or beverage container, or a portion thereof, having a metal substrate and a food-contact coating applied on at least a portion of the metal substrate, wherein the coating is formed from a coating composition that includes a polyether polymer having a polymer backbone, wherein the polymer contains at least two ether linkages in the polymer backbone; is substantially free of segments derived from bisphenol A and epoxides thereof; and is a reaction product of, or can be derived from, reactants including:
(i) an aryl- or heteroaryl-group-containing diepoxide that is not derived from a polyhydric phenol or a glycidyl ester; and
(ii) a polymer backbone extender, wherein the extender:
(a) has two functional groups reactive with an epoxy group; and
(b) provides, following reaction with the diepoxide:
(i) at least one pendant aryl or heteroaryl group on the polymer backbone, or
(ii) at least one divalent aryl or heteroaryl group in the polymer backbone and linked to the backbone via ether linkages,
wherein the diepoxide includes a segment of Formula I shown below:

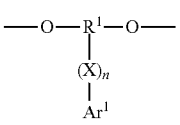

wherein:
each depicted oxygen atom in Formula I is present in an ether linkage;
$R^1$ is a trivalent organic group having from 1 to 10 carbon atoms;
X is a divalent organic group having from 1 to 10 carbon atoms, an oxygen atom, a sulfur atom, or a nitrogen-containing group;
n is 0 or 1; and
$Ar^1$ is an aryl or heteroaryl group which does not contain a bisphenol monomer segment and forms a pendant group in the polymer backbone.

18. The article of claim 17, wherein the segment of Formula I has an atomic weight less than 500 Daltons.

19. The article of claim 17, wherein the polymer is derived from a diepoxide of Formula II shown below:

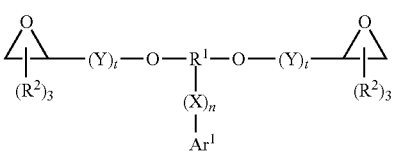

wherein:

R$^1$, X, Ar$^1$, and the subscript n are the same as in Formula I;

Y, if present, is a divalent organic group including at least one carbon atom;

each t is independently 0 or 1; and each R$^2$ is a hydrogen atom.

20. An article comprising a food or beverage container, or a portion thereof, having a metal substrate and a food-contact coating applied on at least a portion of the metal substrate, wherein the coating is formed from a coating composition that includes a polyether polymer having a polymer backbone, wherein the polymer contains at least two ether linkages in the polymer backbone; is substantially free of segments derived from bisphenol A and epoxides thereof; and is a reaction product of, or can be derived from, reactants including:

(i) an aryl- or heteroaryl-group-containing diepoxide that is not derived from a polyhydric phenol or a glycidyl ester; and (ii) a polymer backbone extender, wherein the extender:
  (a) has two functional groups reactive with an epoxy group; and
  (b) provides, following reaction with the diepoxide:
    (i) at least one pendant aryl or heteroaryl group on the polymer backbone, or
    (ii) at least one divalent aryl or heteroaryl group in the polymer backbone and linked to the backbone via ether linkages, wherein the diepoxide is derived from a compound having:

a single phenyl hydroxyl group; and an alcohol that is not a phenyl hydroxyl group and is capable of reacting with epichlorohydrin to provide an epoxide group.

* * * * *